United States Patent

[11] 3,570,502

| [72] | Inventors | Le Moyne E. Farnsworth<br>Racine;<br>John H. Jurkens, Wauanakee, Wis. |
|---|---|---|
| [21] | Appl. No. | 833,555 |
| [22] | Filed | June 16, 1969 |
| [45] | Patented | Mar. 16, 1971 |
| [73] | Assignee | John H. Jurkens<br>Dane County, Wis. |

[54] VEHICLE WASHING APPARATUS
17 Claims, 8 Drawing Figs.

[52] U.S. Cl.................................................. 134/45, 134/123
[51] Int. Cl................................................ B60s 3/02
[50] Field of Search........................................134/45, 123

[56] References Cited
UNITED STATES PATENTS

| 3,196,888 | 7/1965 | Rousseau................... | 134/45 |
| 3,349,783 | 10/1967 | Ellis............................ | 134/45 |
| 3,421,169 | 1/1969 | Hergonson.................. | 134/45 |

*Primary Examiner*—James A. Leppink
*Attorney*—Andrus, Sceales, Starke and Sawall ABSTRACT: A vehicle washing apparatus utilizing high pressure liquid spray nozzles. The apparatus includes a pair of side banks, each incorporating a series of rotatable spray nozzles adapted to spray high pressure cleaning liquid against the sides of the vehicle, and a movable carriage carrying a set of spray nozzles on both its front and rear surfaces is adapted to ride over the top of the vehicle as it moves through the apparatus to clean the front, top and rear surfaces of the vehicle.

The carriage is mounted to rotate about a horizontal transverse axis, and during the washing cycle, the carriage rotates 180° from its original position so that the set of nozzles, which was originally facing to the rear will be facing to the front at the completion of the washing cycle and the second set of nozzles will be facing to the rear in position to wash the next succeeding vehicle advancing through the apparatus.

Patented March 16, 1971

Inventors
John H. Jurkens
LeMoyne E. Farnsworth
By
Andrus, Sceales, Starke & Sawall
Attorneys

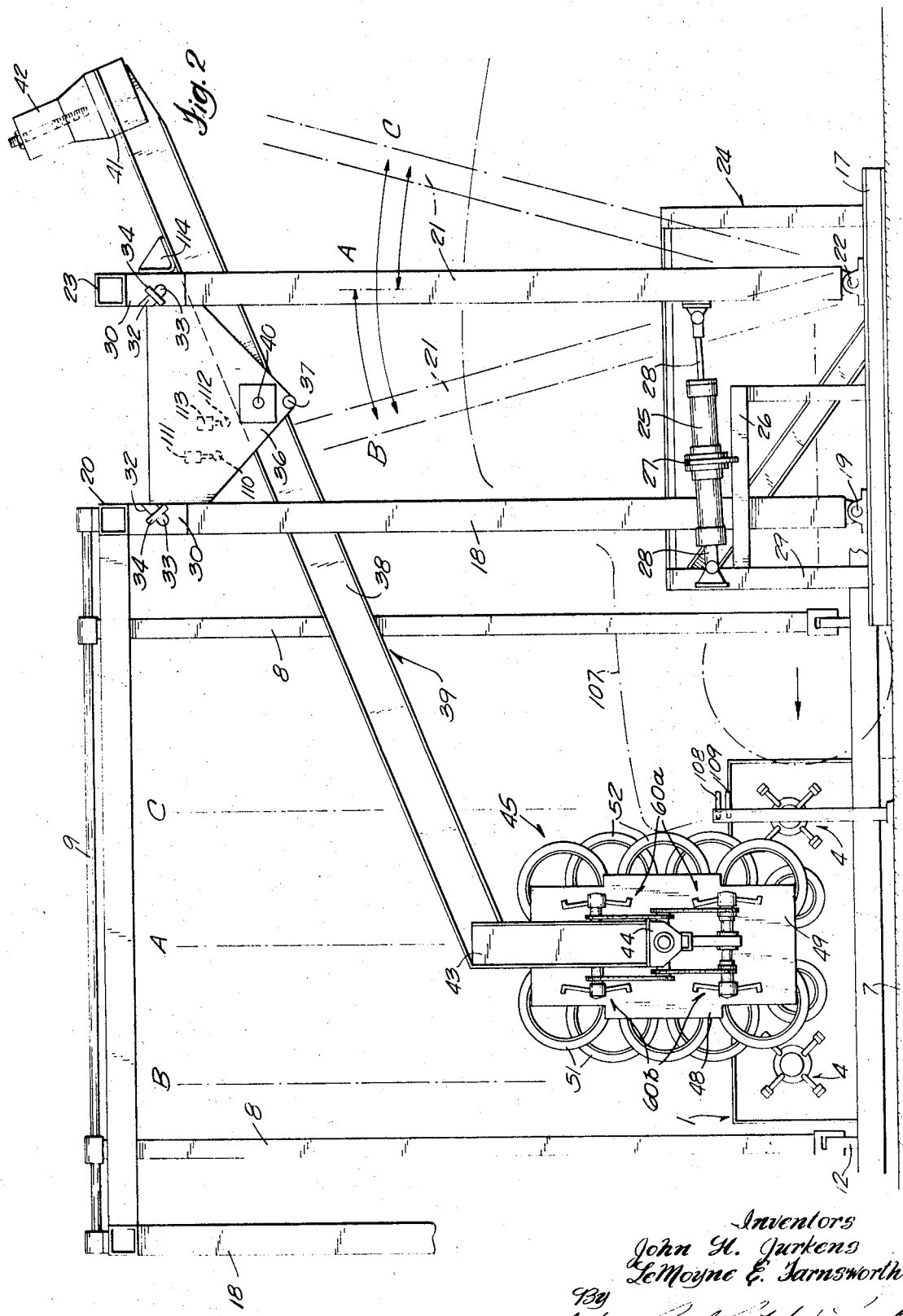

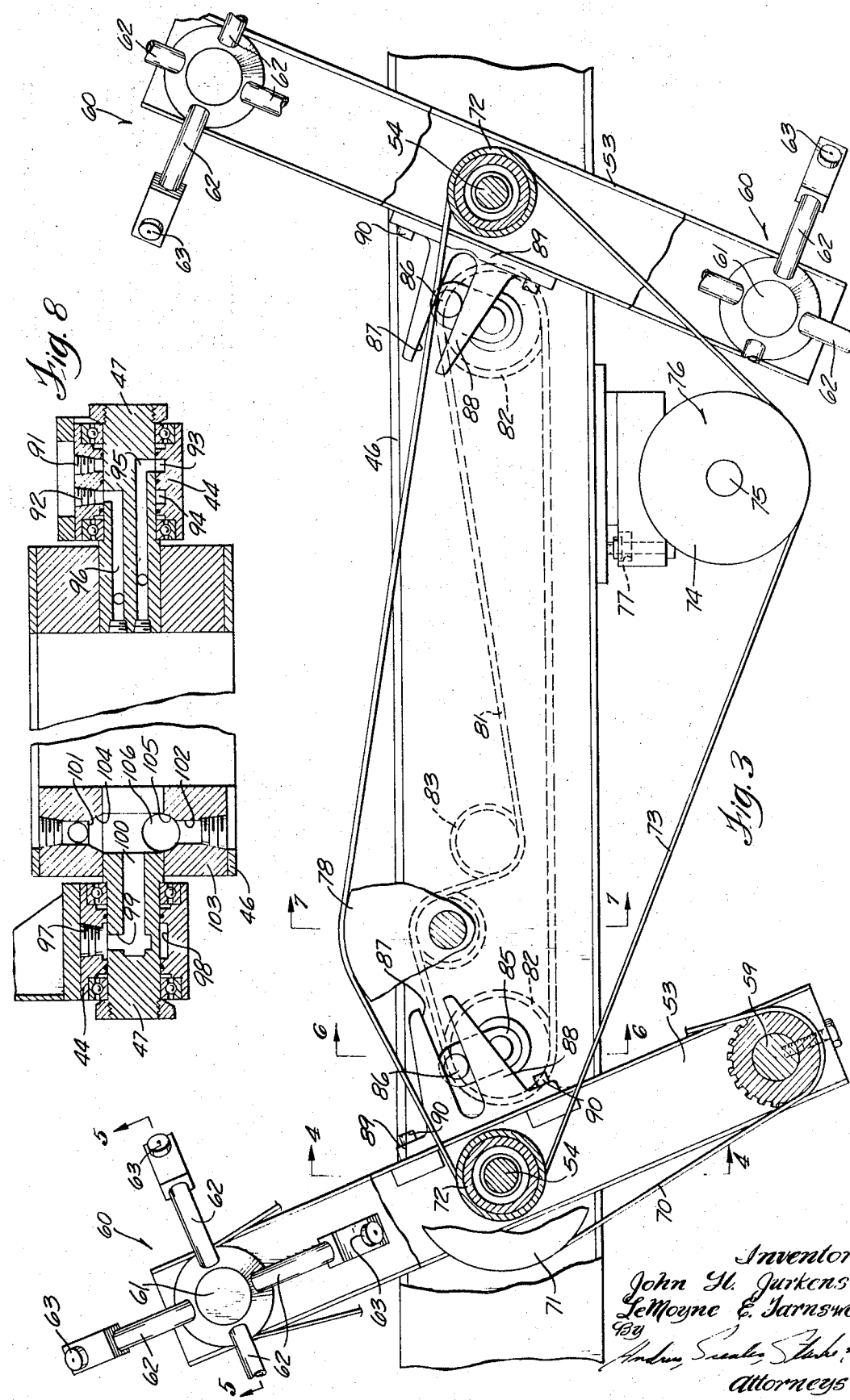

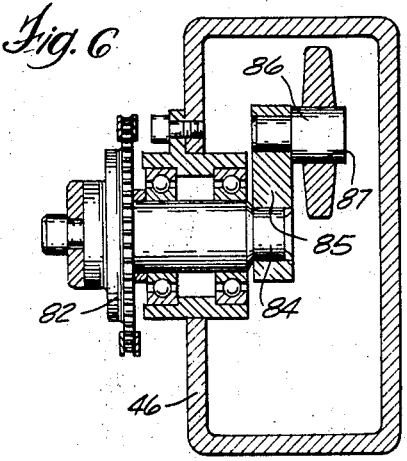
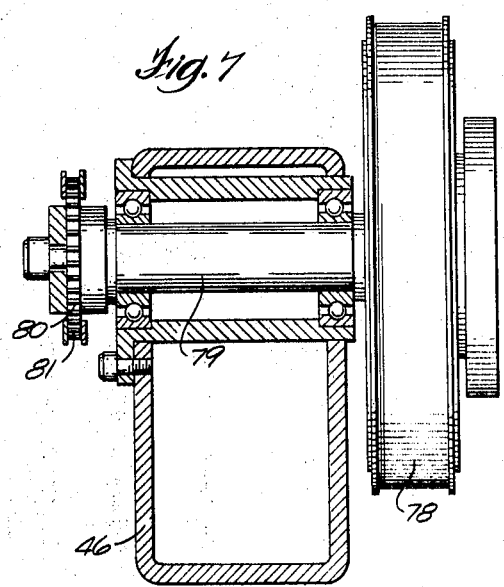
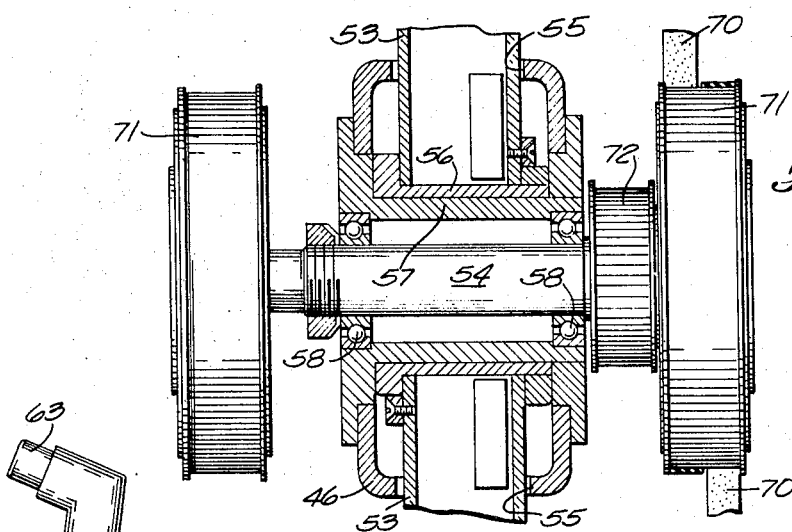
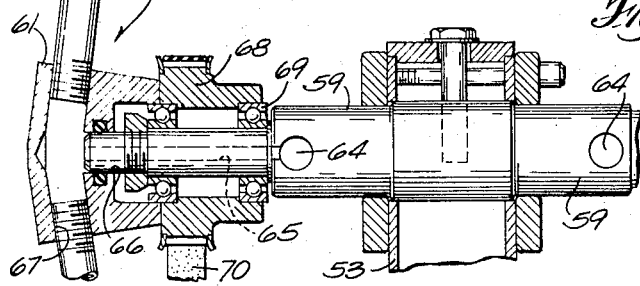

VEHICLE WASHING APPARATUS

This invention relates to a vehicle washing apparatus and more particularly to a vehicle washing apparatus utilizing high pressure liquid spray nozzles.

In the typical vehicle washing apparatus, the vehicle is moved by a conveyor through a series zones or stations where the vehicle is successively washed, air dried and subsequently hand dried. Most existing washing washing units of this type utilize brushes to clean the sides and top surfaces of the vehicle after the vehicle is sprayed with a washing solution. Even through the brushes are relatively large in size and have soft flexible bristles, the use of brushes nevertheless has serious drawbacks. Initially, the brushes tend to rub any abrasive material or grit located on the vehicle body into the painted surface, thereby often marring or scratching the same. Secondly, the brushes cannot adequately penetrate into all recesses, crevices and other indentations in the vehicle body, with the result that manual labor is usually required to clean the recessed areas and this increases the overall cost of the washing operation.

The use of high pressure liquid has decided advantages over the use of brushes, but to perform satisfactorily the high pressure spray nozzles must be maintained a given distance and attitude from the vehicle at all times. While this can be readily accomplished with side banks incorporating spray nozzles to clean the sides of the vehicle, no satisfactory unit has been devised to adequately clean the front, top and rear of the vehicle using spray nozzles.

The present invention is directed to a vehicle washing apparatus utilizing high pressure liquid spray nozzles to clean all surfaces of the vehicle. According to the invention, the apparatus includes pair of side banks, each of which incorporates a series of rotatable spray nozzles adapted to discharge high pressure cleaning liquid against the sides of the vehicle, and a carriage, carrying a series of rotatable spray nozzles, is adapted to ride over the top of the vehicle to clean the front, top and rear surfaces of the vehicle. More specifically, the carriage is mounted for rotation on a movable overhead frame and in its original or neutral position, at the start of the washing cycle, the carriage is in the path of movement of the vehicle. The carriage includes a series of rotatable, high pressure liquid spray nozzles facing rearwardly in the direction of the approaching vehicle and a series of wheels, mounted for rotation about horizontal axes, are also supported on the carriage and face rearwardly in the direction of the approaching vehicle.

As the vehicle approaches and engages the carriage, the frame moves the carriage forwardly, in accordance with forward movement of the vehicle, so that the spray nozzles on the carriage can adequately clean all portions of the front of the vehicle, such as the bumper, grille, head lights, and the like. After this stroke of forward movement, continued forward movement of the vehicle causes the wheels of the carriage to ride upwardly on the front of the vehicle, over the hood, upwardly over the windshield and across the top of the vehicle. The frame, being freely mounted for vertical pivotal movement, enables the carriage to move vertically as the vehicle passes therebeneath.

As the carriage moves over the top of the vehicle, the frame is moved to the rear to position the carriage to the rear of its original or neutral position. Continued movement of the vehicle causes the wheels of the carriage to ride down the back of the vehicle, and the spray nozzles continue to discharge liquid against the rear surfaces of the vehicle. When the carriage reaches its lowermost portion, to the rear of the vehicle, the frame again moves forwardly so that the carriage can follow forward movement of the vehicle and thereby thoroughly clean all of the rear surfaces of the vehicle, such as the rear bumper and tail lights. With this action, the spray nozzles carried by the carriage can effectively clean the front, top and rear surfaces of the vehicle.

The wheels on the carriage are designed with sizes and are positioned so that the spray nozzles are maintained at approximately the same distance from the surface of the vehicle at all times during the travel of the carriage thereby insuring a uniform cleaning operation.

As the wheels ride on the front, top and rear surfaces of the vehicle, the carriage rotates 180° during the washing cycle so that the wheels and the spray nozzles, which were originally facing to the rear, face to the front after completion of the cycle. According to the invention, the carriage includes a set of wheels and spray nozzles on both the front and rear surfaces so that after completion of one washing cycle, the second set of wheels and spray nozzles will be facing to the rear in position to wash the next vehicle proceeding through the apparatus.

As a feature of the invention, a provision is made to automatically supply cleaning or detergent solution to the set of spray nozzles facing the vehicle and to prevent discharge of the cleaning solution from the set of nozzles facing away from the vehicle. At the completion of the washing cycle when the carriage has rotated 180° and the second set of nozzles is facing to the rear in position to wash the next succeeding vehicle, the supply of cleaning solution is automatically shut off to the first set of nozzles and is introduced to the second set of nozzles.

The vehicle washing apparatus of the invention utilizes high pressure spray nozzles, not only for washing the sides of the vehicle, but also the front, top and rear surfaces. The use cleaning of the vehicle for the high pressure liquid can readily penetrate into recesses, crevices and other relatively inaccessible areas. By providing a more thorough cleaning operation, manual labor is eliminated.

By eliminating the use of brushes in the apparatus any possibility of scratching or marring the surface of the vehicle due to abrasive rubbing action is correspondingly eliminated.

Other objects and advantages will appear in the course of the following description.

The drawings illustrate the best mode presently contemplated of carrying out the invention.

In the drawings:

FIG. 2 is a side elevation of the apparatus shown in FIG. 1 with the side bank units not shown;

FIG. 3 is an enlarged front view of the carriage with parts broken away in section;

FIG. 4 is a section taken along line 4—4 of FIG. 3;

FIG. 5 is a section taken along line 5—5 of FIG. 3;

FIG. 6 is a section taken along line 6—6 of FIG. 3;

FIG. 7 is a section taken along line 7—7 of FIG. 3; and

FIG. 8 is a longitudinal section with parts broken away showing the structure for introducing the washing solution and the hydraulic fluid to the carriage.

Figure 1:
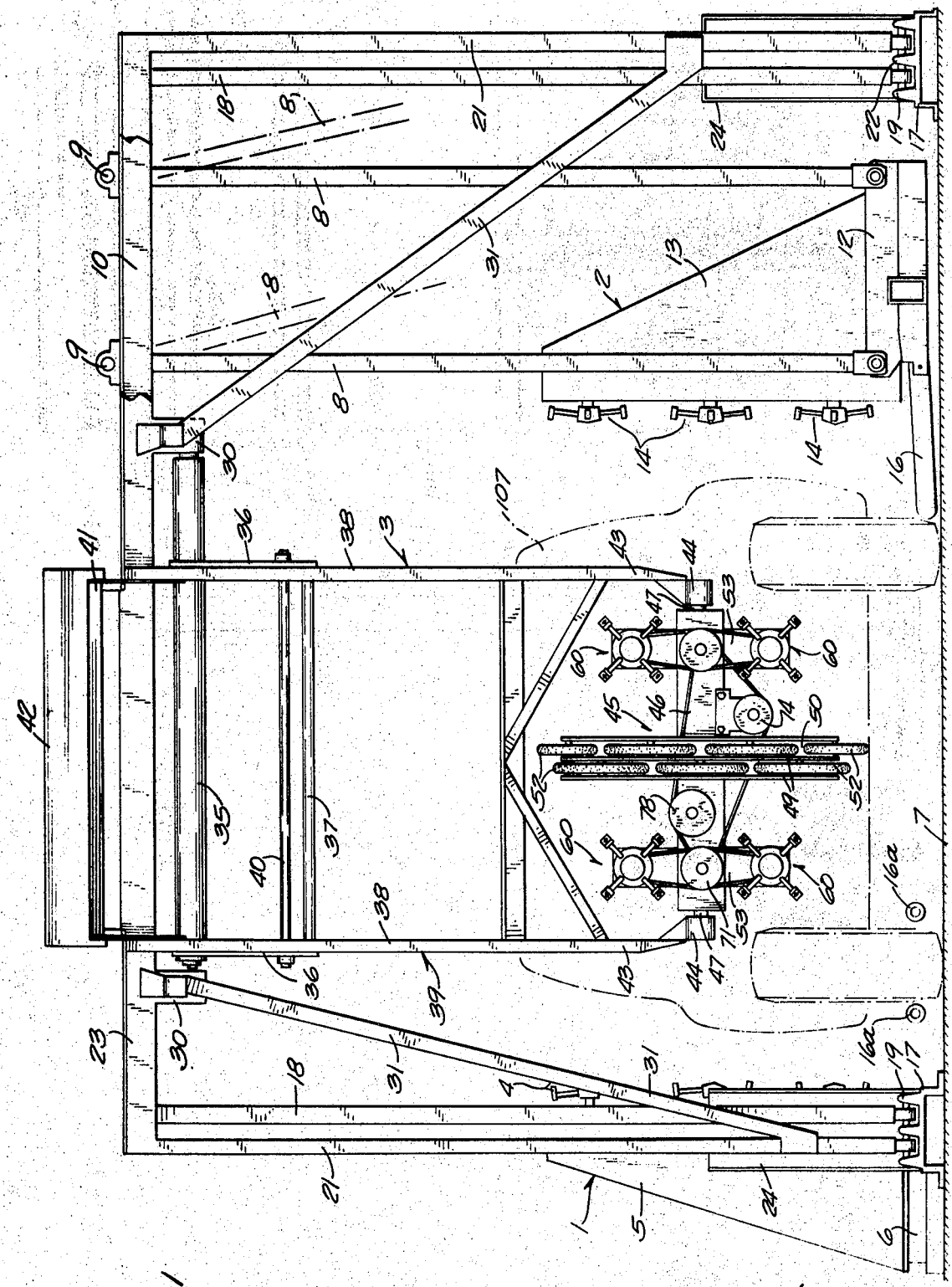
FIG. 1 is an end view of the car washing apparatus of the invention.

As shown in FIGS. 1—8 the vehicle washing apparatus of the invention includes a fixed side bank unit 1, a movable side bank unit 2, and a central unit 3. The vehicle to be washed is conveyed by a conveyor, not shown, mounted in the foundation, and as the vehicle passes through the apparatus high pressure liquid from spray nozzles mounted on the side banks 1 and 2 impinge against the sides of the vehicle to clean the same. The central unit 3 which is located in the path of travel of the vehicle, is adapted to ride over the top of the vehicle, as the vehicle moves through the apparatus, and high pressure liquid, being discharged from spray nozzles carried by the central unit 3 impinges against the front, top and rear of the vehicle to clean these surfaces.

The side bank unit 1 is stationary with respect to the foundation and includes a series of high pressure spray nozzles 4 which are mounted for rotation with respect to the housing 5 which contains the drive mechanism for operating the spray nozzles as well as the liquid supply system for supplying the cleaning solution to the nozzles. Housing 5 is supported on base 6 which in turn is carried by the foundation 7.

The side bank unit 2 is adapted to be moved laterally with respect to the path of travel of the vehicle in order to accommodate vehicles of various widths. The side bank unit 2 includes two pair of vertical supports 8 which are pivotally connected at their upper ends to shafts 9 and shafts 9 are journaled for rocking movement in bearings carried by crossbeams 10. The ends of crossbeams 10 are supported on vertical columns 11 which rest on foundation 7 and are located on either side of the path of travel of the vehicle. The upper ends of columns 11 are also connected together by longitudinal beams. The members 10 and 11 comprise a generally U-shaped frame or tunnel through which the vehicle passes as it advances through the washing unit.

The lower ends of the vertical supports 8 are connected by a base 12 and a housing 13, similar to housing 5, is mounted on the base. A series of high pressure rotatable spray nozzles 14, similar to spray nozzles 4, are mounted for rotation with respect to the housing 13. The housing 13 is in the form of an inverted T, and a series of spray nozzles 14 are mounted on the horizontal base portion of the T-shaped housing and a second series of nozzles are mounted on the upstanding stem of the T-shaped housing. As in the case of spray nozzles 4, the mechanism for rotating spray nozzles 14, as well as the system for supplying the washing solution to the spray nozzles, is located within the housing 13.

Extending laterally inward from the base 12 is a diagonally extending bar 16 which is adapted to be engaged by the right front tire of the vehicle as it moves into the washing apparatus, while the left front tire rides between the fixed guide bars 16a attached to the foundation. Depending on the width of the vehicle, the right tire will tend to pivot the side bank unit 2 laterally outward about the shafts 9 so that the spray nozzles 14 will be positioned at approximately the same distance from the side of the vehicle regardless of the width of the vehicle. Thus, the engagement of the vehicle tire with the bar 16 controls the spacing between the spray nozzles on the side bank units 1 and 2 to most effectively clean all surfaces of the side of the vehicle as it passes between the side banks.

The central washing unit 3 is supported from a frame including a pair of base members 17 supported on the foundation 7 on either side of the path of travel of the vehicle. An arm 18 extends upwardly from each base 17 and the lower end of each arm is pivotally connected to bearing block 19 mounted on the base. Crossmembers 20 connect the upper ends of the arms 18 together to form a generally U-shapted structure.

A second arm 21, parallel to arm 18, extends upwardly from each base 17. The lower ends of arms 21 are pivotally connected to bearing blocks 22 mounted on the bases 17, while the upper ends of the arms 21 are connected together by crossbeams 23.

Arms 18 are located forwardly, in the direction of vehicle travel, from arms 21 and also positioned laterally inward from arms 21 as shown in FIG. 1. The arms 18 and 21 are adapted to be pivoted in unison with respect to the bases 17. In this connection, a frame 24 is mounted on each base 17 and a pair of back-to-back cylinders 25 are connected to a horizontal member 25 of frame 24 by a bracket 27. A piston, not shown is slidable within each cylinder 25 and piston rods 28 are connected to the pistons and extend out of each end of the cylinder. One of the rods 28 is pivotally connected to the vertical member 29 of frame 24, while the opposite rod 28 is pivotally connected to the respective arm 21.

By supplying hydraulic fluid into the right cylinder 25, as viewed in FIG. 2, to retract the piston rod 28 the arms 18 and 21 will pivot to the left as shown in FIG. 2. Conversely, by introducing hydraulic fluid into both cylinders 25 to extend both piston rods, the arms 18 and 21 will be pivoted to the right as viewed in FIG. 2. The use of two back-to-back cylinders provides a convenient means of pivoting the arms 18 and 21, as well as accurately indexing the arms to the vertical or neutral position, by the extension of one cylinder rod only.

Both of the cross members 20 and 23 carry a pair of generally box-shaped hangers 30 and braces 31 connect the hangers 30 on each cross member with the respective arms 18 and 21. As best shown in FIG. 2, each hanger is provided with an inclined slot 32 and a generally horizontal shaft 33 is disposed within the slot and maintained therein by keeper plate 34. The shafts 33 are each disposed within an outer sleeve 35 and the ends of each sleeve are connected to a generally triangular plate 36 which extends between the hangers 30 and downwardly from the level of the hangers. The lower ends of the triangular-shaped plates 36 are connected together by tie rods 37. With this construction the sleeves 35, plates 36 and tie rods 37 comprise an integral frame which is supported from the hangers 30.

Arms 38 of a lift frame 39 are secured to a shaft 40 which is journaled for rotation with respect to the plates 36. The upper ends of the arms 38 are connected together by a crossframe 41 and a series of weights 42, which provide a counterbalancing means, are mounted on the cross frame 41. The lower ends of the arms 38 are connected together by a crossmember and extensions 43 extend downwardly from the arms 38 and carry trunnions 44.

A carriage 45 is mounted for rotation with respect to the trunnions 44. As best shown in FIG. 3 the carriage 45 includes a generally horizontal frame 46 having a boxlike cross section, and shafts 47 extend outwardly from the ends of frame 46 and are journaled within the trunnions 44.

The carriage 45, in its neutral or original position at the start of the washing cycle, is located above the foundation 7 in the path of travel of the vehicle, with the vertical midpoint of the carriage being at a level approximately equal to the grille or hood of the vehicle. In addition, the neutral position of the carriage is in approximately the same transverse plane as the side bank units 1 and 2. Extending forwarding from the frame 46 are a series of generally vertical parallel plates 48 and a similar series of parallel vertical plates 49 extend rearwardly from the frame 46. Angle brackets 50 are employed to connect the plates 48 and 49 to the frame 46 with one flange of each angle bracket 50 being connected to the outer surface of the frame 46 while the other flange of the angle bracket is connected flatwise to the respective plates 48 and 49.

A series of wheels 51 are journaled for rotation between the parallel plates 48, and similarly, a second series of wheels 52 are journaled for rotation between the plates 49. As shown in the drawings, there are seven wheels 51, as well as seven wheels 52, which are located in two vertical rows with the axes of the wheels being offset vertically. In addition, the uppermost and lowermost wheel of each series has a smaller diameter than the remaining wheels of each series. The wheels 51 and 52 are provided with flexible or resilient coverings, such as pneumatic tires, and as the vehicles moves into engagement with the carriage the wheels ride against the front end of the car, upwardly over the hood and windshield, across the top of the car and downwardly along the rear of the car. The carriage 45 carries a series of high pressure liquid spray nozzles which eject a cleaning solution against the surface of the vehicle as the carriage 45 moves over the surface of the vehicle. As best shown in FIG. 3, a pair of arms 53 are mounted for oscillating movement on each end of the frame 46. Each arm 53 is mounted to rotate about the axis of a shaft 54 which extends through aligned openings in the side walls of frame 46. As shown in FIG. 4, the upper and lower surfaces of the frame 46 are provided with slots 55 and the arms 53 project through the slots. The slots 55 are provided with a sufficient length so that the arms 53 can freely oscillate about the axes of the shafts 54.

As shown in FIG. 4 each arm 53 carries a sleeve 56 which is journaled for rotation about bushing 57 and the bushings 57 in turn are mounted for rotation about the shaft 54 by ball bearing assemblies 58.

The outer ends of the arms 53 carry transverse shafts 59 and a pair of spray nozzles assemblies 60 are mounted for rotation on the ends of each shaft 59. As best shown in FIG. 5, each spray nozzle assembly 60 includes a body portion 61 and a series of tubular arms 62 extend outwardly in a radial direction from the body 61. The end of each arm 62 carries a nozzle 63 through which the high pressure cleaning solution is discharged toward the vehicle. The cleaning solution is introduced to each spray nozzle assembly through an inlet 64 connected by hose, not shown, to a manifold carried by the frame 46. Inlet 64 is connected to the central passage 65 in shaft 59 which, in turn, communicates with a central passage 66 in body 61. The outer end of the central passage 66 is in communication with a series of radial passages 67 in body 61, which in turn are connected to the interior of the arms 62. The cleaning solution entering through the inlet 64 passes through the passages 65, 66 and 67 and is then discharged through the arms 62 and nozzles 63.

As best shown in FIG. 5, the nozzles 63 are canted or disposed at an angle with respect to the axis of shaft 59. This outward canting of the nozzles 63 prevents reflection of spray upon itself and increases the spray pattern of the nozzles and thereby enables each nozzle to cover a greater area of the vehicle.

To rotate each spray nozzle assembly 60, a pulley 68 is journaled by bearing assembly 69 on the outer surface of shaft 59 and the pulley 68 is connected to the body 61 of the nozzle assembly. A belt 70 connects the pulleys 68 on each side of each arm 53 with a pulley 71 carried by shaft 54. To rotate the shafts 54, a small pulley 72 is mounted on each shaft 54, and pulley 72 is connected by a belt 73 to a pulley 74 carried by the drive shaft 75 of hydraulic motor 76. Motor 76 is supported from the frame 46 by a mounting bracket 77. As best shown in FIG. 3, the belt 73, driven by the pulley 74, drives the pulleys 72 associated with both of the arms 53 and rotation of each pulley 72 rotates the pair of pulleys 71 through shaft 54. Pulleys 71 operate through belts 70 to rotate the spray nozzle assemblies 60.

The belt 73 also serves to drive pulley 78 which is carried by a shaft 79 journaled within aligned openings within the frame 46. The opposite end of the shaft 79 carries a sprocket 80 and sprocket 80 is connected by a chain 81 to a pair of sprockets 82 and to a tensioning sprocket 83 which is mounted for rotation on the frame 46. The chain 81 provides the driving source for oscillating the arms 53 about the axes of the shafts 54.

As best shown in FIG. 6, each sprocket 82 is mounted on the end of a shaft 84 which is journaled within an opening in one side wall of the frame 46 by a suitable bearing assembly. The inner end of the shaft 84 carries a crank arm 85 and the crank arm is provided with an outwardly extending pin 86, adapted to ride within a slot 87 in the forked bracket 88. The base 89 of the bracket is connected by bolts 90 to the side surface of the respective arm 53. As the crank arm 85 is rotated through the chain drive 81, the pin 86 rides within the slot 87 and provides the forked bracket 88 with an oscillating type of motion which is transmitted to the arms 53. As shown by the phantom lines in FIG. 3, the arms are adapted to oscillate through an arc of approximately 60° and this oscillating movement increases the effective discharge or spray area of the nozzle assemblies 60 carried by the ends of the arm 53.

To introduce hydraulic fluid to the motor 76 on carriage frame 46, one of the trunnions 44 is provided with an inlet opening 91 and an outlet opening 92. Inlet 91 is connected by a hose, not shown, to the discharge side of a hydraulic pump, while the outlet 92 is connected to the reservoir for hydraulic fluid. The inlet 91 communicates with a circumferential groove 93 formed in the trunnions 44, and the outlet 92 is in communication with a similar groove 94. Groove 93 communicates with a passage 95 formed in the shaft 47 and passage 95 is connected by a suitable hose to the inlet of the motor 76. Fluid being returned from the motor is discharged from a hose, not shown, to a passage 96 in shaft 47 which is in communication with the outlet 92 through circumferential groove 94. With this construction the fluid inlet 91 will be in continuous communication with the passage 95, even though the carriage 45 is rotated with respect to the trunnions 44, and similarly, the discharge passage 95 will be in continuous communication with the outlet 92.

As shown in FIG. 8, the trunnion 44 is at the opposite end of the frame 46 and serves as an inlet for the cleaning solution. Trunnion 44 is provided with a radial inlet passage 97 which communicates with a circumferential groove 98 formed in the inner surface of the trunnion 44. Groove 98, in turn, communicates with a radial passage 99 which is connected to the axial passage 100 in shaft 47. The inner end of axial passage 100 is connected to a pair of radial passages 101 and 102 in a valve block 103 mounted within the end of the frame 46. The central portion of passage 101 defines a valve seat 104 and similarly, the central portion of passage 102 defines a valve seat 105. A ball 106, which is freely movable within the passages 101 and 102, is alternately adapted to engage the seats 104 and 105 to control the flow of cleaning solution to the spray nozzle assemblies 60 on each side of the arms 53, as will be described hereinafter.

The vehicle 107 is moved through the washing unit by a conventional endless conveyor which is mounted in the foundation 7 and engages the wheel of the vehicle. At the start of the washing cycle, the carriage 45 is located above the foundation 7 and in the path of movement of the vehicle, with the wheels 52 facing toward the approaching vehicle. As the front end of the vehicle approaches the carriage 45, the vehicle engages the limited switches 108 and 109 mounted on posts or columns supported by foundation 7. Actuation of limit switch 108 opens a solenoid valve to discharge the cleaning solution from a source of supply to the inlet 97 in the trunnion 44. At this time the ball valve 106 is engaged with the seat 105 so that the cleaning solution will be discharged through the passage 101 and then through suitable lines to the series of spray nozzles 60 on the side of the carriage facing the approaching vehicle. In addition, actuation of the limit switch 109 operates to introduce fluid into the right hand end of the right cylinder, as viewed in FIG. 2, to retract the piston rod 28 and pivot the arms 18 and 21 from the original vertical position to a forward position. As the arms 18 and 21 carry the lift frame 39 which supports the carriage 45, the carriage will be moved forwardly ahead of the vehicle a distance corresponding to the pivotal movement of the arms 18 and 21. As shown in FIG. 2, the carriage 45 during this stroke of forward movement will move from the neutral position A to the forward position B and during this time the water being discharged from the spray nozzle assemblies 60 will be directed against the front bumper, grille and headlights of the vehicle. At the end of the stroke of forward movement of the lift frame 39 and carriage 45, continued forward movement of the vehicle 107 will cause the carriage to ride upwardly over the top of the vehicle. More specifically, the wheels 52 will ride over the hood, up the windshield and along the top of the vehicle. As the wheels 52 ride over the vehicle the cleaning solution is ejected from the series of nozzles 60a to clean the front and upper surface of the vehicle, but due to the ball valve 106 being seated on seat 105 cleaning solution will not be discharged from the nozzle assemblies 60b on the opposite side of the carriage even though the arms 53 on the opposite side of the carriage are oscillating. As the lift frame 39 is freely pivotable in a vertical plane and as the carriage can rotate about the trunnions 44 with respect to the lift frame, the carriage 45 is free to follow the contour of the vehicle. When riding over the top of the vehicle, the wheels 52 and nozzle assemblies 60a will be facing downwardly, having rotated approximately 90° from their original position as shown in FIG. 2. The size and spacing of wheels 52 serve to maintain the nozzle assemblies at a substantially uniform distance from the vehicle at all times. Due to the counterbalancing effect of the counterweight 42 very little force is required to lift the frame 39, thereby enabling the carriage 45 to move over hard top vehicles as well as convertibles or soft tops.

When the arms 38 on lift frame 39 are pivoted upwardly to a predetermined position, the arms 39 actuate a second limit switch 110 carried by bracket 111. Actuation of limit switch 110 serves to introduce fluid to cylinders 25 to extend the piston rods 28 of both cylinders in FIG. 2, thereby pivoting the arms 18 and 21 to the rear and moving the carriage 45 from the plane B to the plane C. The rearward movement of the carriage and lift frame is accomplished while the carriage is moving over the top of the vehicle.

As the vehicle continued to move forwardly, the wheels 52 of carriage 46 will ride on the trunk or rear portion of the vehicle and will then follow the rear contour of the vehicle. During this path of movement the spray nozzles 60a associated with the wheels 52 are discharging the cleaning solution against the rear surface of the vehicle.

When the lift frame 39 pivots downwardly to a predetermined lower position, one of the arms 38 actuates a limit switch 112 carried by bracket 113 to thereby introduce hydraulic fluid into the left hand end of the right hand cylinder 25, as viewed in FIG. 2, thereby extending the piston rod and pivoting the arms 18 and 21 forwardly to the original vertical position and moving the carriage 45 from plane C back to its original or neutral position at plane A. Forward movement of the carriage follows the forward movement of the vehicle, so that the spray nozzles 60a have an opportunity to clean the rear bumper and tail lights on the vehicle. As the rear of the vehicle passes the limit switch 108, the switch is released to discontinue the flow of cleaning solution to the carriage and complete the washing cycle. At this time the carriage 45 is in its neutral position with the wheels 51 and spray nozzles 60b facing the next vehicle moving into the washing unit.

At the completion of the cycle the wheels 52, which originally were facing rearwardly, are facing forwardly due to the fact that the carriage 45 pivoted b 180° during the washing cycle. Thus, the next succeeding vehicle will contact the wheels 51, rather than wheels 52, as previously described. In a similar manner, the wheels 51 will move over the top of the next vehicle and the cleaning solution will be discharged through nozzles 60b At the completion of this washing cycle, the wheels 52 will again be facing rearwardly in position to be contacted by the next succeeding vehicle.

As previously described, the ball 106 was engaged with the valve seat 105 at the beginning of the first washing cycle so that the cleaning solution was discharged through passage 101 to the series of spray nozzles 60a on the rear facing side of the carriage. As the carriage climbs upwardly over the top of the vehicle the passages 101 and 102 in valve block 103 will move to a generally horizontal attitude. Due to the pressure of the cleaning solution within the passages in the valve block, the ball valve 106 will be held in closed position with relation to the valve seat 105, even though the passages 101 and 102 are horizontal.

As the carriage 45 follows the rear contour of the vehicle, the passages 101 and 102 will again move to a vertical attitude with the passage 102 being located above the passage 101. However, due to the pressure of the cleaning solution, the ball valve 106 will not fall from the valve seat 105 so that the cleaning solution will continue to be discharged through the opening 101 to the nozzle assemblies 60a and against the surface of the vehicle. At the end of the washing operation, the supply of cleaning solution through passage 97 is cut off through actuation of the solenoid valve, and the resulting reduction of pressure in the internal passages permits the ball 106, which is in the upper position, to fall downwardly by gravity onto the valve seat 104 which is then in a lower position. When the cleaning solution is again supplied to the valve block 103 as the second car moves into the washing zone, the cleaning solution will then be supplied through the passage 102, which at this time extends upwardly, and to the spray nozzles 60b located on the same side of the carriage as the wheels 51. This process is repeated during each washing cycle with the ball valve 106 alternately moving between the valve seats 104 and 105.

To limit the downward movement of the lift frame 39 and the carriage 45, a stop beam 114 is secured to the hangers 30, and the upper surface of the arms 38 will engage the stop 114 to limit the downward movement of the carriage and thereby position the carriage at the desired level above the foundation 7 at the start and end of the washing cycle.

I claim:

1. In an apparatus for washing a vehicle as the vehicle moves through the apparatus, a supporting structure, a carriage mounted for rotation on the supporting structure about a horizontal axis and disposed in the path of travel of the vehicle as it moves through the apparatus, liquid spray means mounted on the carriage and facing to the rear in a direction toward the approaching vehicle for discharging high pressure liquid against the surface of the vehicle, second liquid spray means mounted on the carriage and facing forwardly in a direction away from the approaching vehicle, guide means on the carriage and disposed to ride over the surface of the vehicle as the vehicle moves through the apparatus with liquid being discharged through said first spray means to effectively clean the front, top and rear surfaces of the vehicle as the carriage rides thereover, said carriage pivoting with respect to the supporting structure as the carriage rides over the vehicle to invert the carriage from its original position at the end of the washing cycle, whereby said second liquid spray means faces rearwardly toward the next approaching vehicle.

2. The apparatus of claim 1, and including means for selectively supplying cleaning liquid to said first liquid spray means and for preventing supply of said liquid to the second liquid spray means.

3. The apparatus of claim 2, and including first liquid supply means for supplying liquid to said first liquid spray means, second liquid supply means for supplying liquid to said second liquid spray means, first valve means for controlling the flow of liquid in said first supply means, second valve means for controlling the flow of liquid in said second supply means, means for opening said first valve means and simultaneously closing said second valve means when the carriage is in its original position to supply liquid only to said first spray means, and means for closing said first valve means and opening said second valve means when the carriage is in its inverted position to supply liquid only to said second spray means.

4. The apparatus of claim 3, wherein the carriage includes a frame and said first and second supply means are located within the frame.

5. The apparatus of claim 3, wherein said first and second valve means comprises a valve member movable between a first valve seat in said first supply means and a second valve seat in said second supply means.

6. The apparatus of claim 3, wherein said first and second valve seats are disposed in axial alignment and said valve member is a ball movable between the valve seats.

7. The apparatus of claim 6, wherein the axes of the valve seats are disposed generally vertical when the carriage is in its original position, whereby the ball will fall by gravity when the pressure of the liquid is released to seat in the lower of the two valve seats.

8. The apparatus of claim 1, wherein the guide means includes two sets of wheels with one set of wheels facing forwardly and the other set of wheels facing rearwardly.

9. The apparatus of claim 8, wherein each set of wheels comprises at least two vertically aligned rows with the axes of the wheels in one row being vertically offset from the axes of the wheels in the adjacent rows.

10. The apparatus of claim 1, wherein said first and second liquid spray means each comprises a series of rotatable spray nozzles.

11. The apparatus of claim 10, wherein the axes of the spray nozzles are disposed at an angle to the axis of rotation of the nozzle to thereby increase the pattern of discharge of the nozzle.

12. The apparatus of claim 1, wherein said first and second liquid spray means comprises a pair of arms mounted for oscillating movement on said carriage, a plurality of liquid spray nozzles mounted for rotation on both the front and rear surfaces of each arm, drive means on the carriage, first connecting means connecting the drive means to the nozzles to rotate the nozzles, and second connecting means connecting the drive means with each arm for oscillating the arms with respect to the carriage.

13. In an apparatus for washing a vehicle as the vehicle moves through the apparatus, a supporting structure, means for mounting the supporting structure for movement in a substantially vertical plane, a carriage mounted on the supporting structure for rotation about a horizontal axis, said carriage including a frame member, a first series of rotatable guide members mounted for rotation on said frame member about axes transverse to the direction of travel of the vehicle, said guide members facing rearwardly in the direction toward the approaching vehicle, a first series of rotatable spray nozzles mounted on the frame member of the carriage and facing rearwardly and disposed to discharge a high pressure cleaning liquid against the surface of the vehicle, a second series of rotatable guide members mounted for rotation on said frame member about axes transverse to the direction of travel of the vehicle and facing forwardly away from the approaching vehicle, a second series of rotatable spray nozzles mounted on the frame member and facing forwardly, drive means mounted on the carriage for rotating said spray nozzles, said carriage arranged to ride over the top surface of the vehicle as the vehicle passes through the apparatus with said liquid being discharged through said first series of nozzles to effectively clean the front, upper and rear surfaces of the vehicle as the carriage rides thereover, said carriage pivoting with respect to the supporting structure as the carriage rides over the vehicle to invert the carriage from its original position at the end of the washing cycle, whereby said first guide members and first nozzles face forwardly and said second guide members and said second nozzles face rearwardly toward the next approaching vehicle, and means for selectively supplying cleaning liquid to one of said series of nozzles and for preventing the supply of cleaning liquid to the other of said series of nozzles whereby the liquid is discharged from the series of nozzles facing the vehicle and is not discharged from the series of nozzles facing away from the vehicle.

14. The apparatus of claim 13, and including following means for moving the carriage in a generally horizontal plane, said last named means being operable to move the carriage in a first forward stroke of movement as the vehicle approaches the carriage to thereby enable the series of nozzles facing the vehicle to effectively clean the forward surface of the vehicle, and said following means being operable as said carriage rides down the rear surface of the vehicle to move the carriage in a second forward stroke of movement to enable the carriage to follow the rear of the vehicle and effectively clean the rear surfaces thereof.

15. The apparatus of claim 14, wherein said following means includes a support member to support the carriage, a supporting structure, said supporting member being pivotally connected to the supporting structure about an axis extending transverse to the direction of travel of the vehicle, whereby the carriage is movable in a vertical plane, a foundation, means for pivotally connecting said supporting structure to said foundation about a second axis generally parallel to said first named axis, and means for pivoting said supporting structure about said second axis to thereby move the carriage in a generally horizontal plane.

16. The apparatus of claim 15, wherein said supporting structure includes a pair of vertical supports straddling the path of travel of the vehicle, the lower ends of the vertical supports being pivotally connected to said foundation, said supporting structure also including a cross member connecting the upper ends of the vertical supports together, said supporting member extending between the vertical supports and above the path of travel of the vehicle and being pivotable with respect to said vertical supports.

17. The apparatus of claim 16, wherein said means for pivoting comprises hydraulic means operably connected to at least one of said vertical supports.